United States Patent
Hiremath et al.

(10) Patent No.: US 9,920,742 B2
(45) Date of Patent: Mar. 20, 2018

(54) DYNAMIC CUT-IN WIND SPEED FOR WIND TURBINES

(71) Applicant: General Electric Company, Schenectady, NY (US)

(72) Inventors: Vijaykumar Muppayya Hiremath, Bangalore (IN); Shimnamol Padmanabhan Nair, Bangalore (IN); Aswini Karteek Bommareddy, Bangalore (IN); Karthikeyan Appuraj, Hyderabad (IN)

(73) Assignee: General Electric Company, Schenectady, NY (US)

(*) Notice: Subject to any disclaimer, the term of this patent is extended or adjusted under 35 U.S.C. 154(b) by 883 days.

(21) Appl. No.: 14/184,797

(22) Filed: Feb. 20, 2014

(65) Prior Publication Data
US 2015/0233348 A1    Aug. 20, 2015

(51) Int. Cl.
*G06F 19/00*    (2011.01)
*F03D 7/02*    (2006.01)

(52) U.S. Cl.
CPC ........................... *F03D 7/02* (2013.01)

(58) Field of Classification Search
CPC ............................................. F03D 7/02
USPC .................... 290/44, 55; 700/287
See application file for complete search history.

(56) References Cited

U.S. PATENT DOCUMENTS

| | | | |
|---|---|---|---|
| 8,283,798 B2 | 10/2012 | Siebers et al. | |
| 8,355,823 B2 | 1/2013 | Zhang et al. | |
| 8,386,085 B2 | 2/2013 | Schwarze et al. | |
| 2010/0283245 A1* | 11/2010 | Gjerlov | F03D 7/0224 290/44 |
| 2012/0046917 A1* | 2/2012 | Fang | G01W 1/10 703/1 |
| 2012/0211985 A1* | 8/2012 | Siebers | F03D 7/02 290/44 |

(Continued)

FOREIGN PATENT DOCUMENTS

| | | |
|---|---|---|
| DE | 102007035724 A1 | 2/2009 |
| EP | 2679814 A1 | 1/2014 |
| EP | 2840257 A1 | 2/2015 |

OTHER PUBLICATIONS

Machine translation of EP2840257.*
European Search Report and Opinion issued in connection with corresponding EP Application No. 15155593.5 on Jul. 1, 2015.

*Primary Examiner* — Michael D Masinick
(74) *Attorney, Agent, or Firm* — Dority & Manning, P.A.

(57) ABSTRACT

The present subject matter is directed to a system and method for operating a wind turbine. More specifically, the system and method determines a dynamic cut-in wind speed for the wind turbine based on one or more environmental conditions. In one embodiment, the method includes providing a predetermined cut-in wind speed for the wind turbine based on at least one estimated environmental condition for a wind turbine site; determining one or more actual environmental conditions near the wind turbine for a predetermined time period at the wind turbine site; determining a variance between the at least one estimated environmental condition and the one or more actual environmental conditions; calculating a dynamic cut-in wind speed based on the variance; and, operating the wind turbine based on the dynamic cut-in wind speed so as to increase wind turbine operational efficiency.

17 Claims, 5 Drawing Sheets

(56) References Cited

U.S. PATENT DOCUMENTS

2013/0001946 A1    1/2013    Nielsen et al.

* cited by examiner

DYNAMIC CUT-IN WIND SPEED FOR WIND TURBINES

FIELD OF THE INVENTION

The present invention relates generally to wind turbines, and more particularly, to systems and methods for continuously adjusting the cut-in wind speed for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

It is known that the operation of a wind turbine depends on the wind speed. For example, wind turbines have predetermined wind speed threshold values for determining the operational condition of the wind energy system. One such threshold value is the cut-in wind speed which is defined as the wind speed where the wind energy system starts to generate power. Another example is the cut-out speed which is defined as the highest wind speed during which the wind turbine may be operated while delivering power. Normally, generating energy is stopped at wind speeds higher than the cut-out speed.

Conventional systems and methods for starting the wind turbine uses a predetermined, fixed cut-in wind speed that is typically based on product and/or wind turbine configuration. Actual wind conditions, however, may vary from the estimated wind conditions used to determine the cut-in wind speed. In addition, the wind speed often fluctuates around the cut-in wind speed. As such, the wind turbine may start up, but will not run continuously due to insufficient wind speed and therefore shuts down. Accordingly, the wind turbine repeatedly starts up and shuts down during low wind speed conditions, thereby resulting in a loss of energy production in low wind bins and a reduction in wind turbine power efficiency.

Accordingly, an improved system and method for operating a wind turbine during low wind-speed conditions would be welcomed in the technology. More specifically, a system and method that continuously adjusted the cut-in wind speed of the wind turbine would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating a wind turbine during low wind-speed conditions. The method includes: providing a predetermined cut-in wind speed for the wind turbine based on at least one estimated environmental condition for a wind turbine site; determining one or more actual environmental conditions near the wind turbine for a predetermined time period at the wind turbine site; determining a variance between the at least one estimated environmental condition and the one or more actual environmental conditions; calculating a dynamic cut-in wind speed based on the variance; and, operating the wind turbine based on the dynamic cut-in wind speed so as to increase wind turbine operational efficiency.

In another embodiment, the step of determining one or more actual environmental conditions near the wind turbine for a predetermined time period further includes utilizing one or more sensors configured to monitor the environmental conditions. In an alternative embodiment, the step of determining one or more actual environmental conditions near the wind turbine for a predetermined time period may include estimating the actual environmental conditions utilizing one or more computer models. In a further embodiment, the computer model may include utilizing at least one of or combination of the following: one or more operating conditions of the wind turbine, a plurality of equations, one or more aerodynamic performance maps, and/or one or more look-up tables.

In another embodiment, the operating conditions may include any operation conditions of the wind turbine, including, but not limited to: a pitch angle, a rotor speed, a generator speed, a power output, a torque output, a temperature, a pressure, a tip speed ratio, an air density, or similar. In still a further embodiment, the environmental conditions may include any one of or combination of the following: a wind speed, an air density, a wind gust, a wind direction, a wind acceleration, a wind turbulence, a wind shear, a wind veer, or a wake. In additional embodiments, the method may also include storing the environmental conditions for the predetermined time period in a memory store.

In yet another embodiment, the method may also include verifying that the dynamic cut-in wind speed is within a predetermined range of wind speeds. In further embodiments, the step of calculating the dynamic cut-in wind speed based on the variance may include adding the variance to the predetermined cut-in wind speed to obtain the dynamic cut-in wind speed. More specifically, during turbulent wind conditions, the variance may include a positive value such that addition of the variance and the predetermined cut-in wind speed provides a dynamic cut-in wind speed having a higher value than the predetermined cut-in wind speed. Alternatively, during steady wind conditions, the variance may include a negative value such that addition of the variance and the predetermined cut-in wind speed provides a dynamic cut-in wind speed having a lower value than the predetermined cut-in wind speed.

In another aspect, the present subject matter is directed to a method for operating a wind turbine during low wind-speed conditions. The method includes determining one or more actual environmental conditions near the wind turbine; continuously determining a cut-in wind speed of the wind turbine based on the one or more actual environmental conditions; and, operating the wind turbine based on the determined cut-in wind speed so as to increase wind turbine operational efficiency.

In another embodiment, the step of continuously determining the cut-in wind speed of the wind turbine based on the actual environmental conditions further includes: determining a variance between at least one estimated environmental condition and the one or more actual environmental conditions; and, determining the cut-in wind speed based on the variance. Further, the step of determining the cut-in wind speed based on the variance may further include adding the variance to a predetermined cut-in wind speed.

In further embodiments, the environmental conditions may include any one of or combination of the following: a wind speed, an air density, a wind gust, a wind direction, a wind acceleration, a wind turbulence, a wind shear, a wind veer, or a wake. In additional embodiments, the method may further include verifying that the cut-in wind speed is within a predetermined range of wind speeds.

In yet another aspect, the present subject matter is directed to a system for operating a wind turbine during low wind-speed conditions. The system includes: a processor configured to: provide a predetermined cut-in wind speed for the wind turbine based on at least one estimated environmental condition for a wind turbine site; determine one or more actual environmental conditions near the wind turbine for a predetermined time period at the wind turbine site; determine a variance between the one or more estimated environmental conditions and the actual environmental conditions; calculate a dynamic cut-in wind speed based on the variance; and, a controller configured to operate the wind turbine based on the dynamic cut-in wind speed so as to increase wind turbine operational efficiency.

In another embodiment, the system may also include one or more sensors configured to monitor the one or more actual environmental conditions. The processor may also be configured to estimate the environmental conditions using one or more computer models. In various embodiments, the environmental conditions may include any one of or a combination of the following: a wind speed, an air density, a wind gust, a wind direction, a wind acceleration, a wind turbulence, a wind shear, a wind veer, or a wake. In still further embodiments, the system may also include a memory store configured to store the environmental conditions for the predetermined time period.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
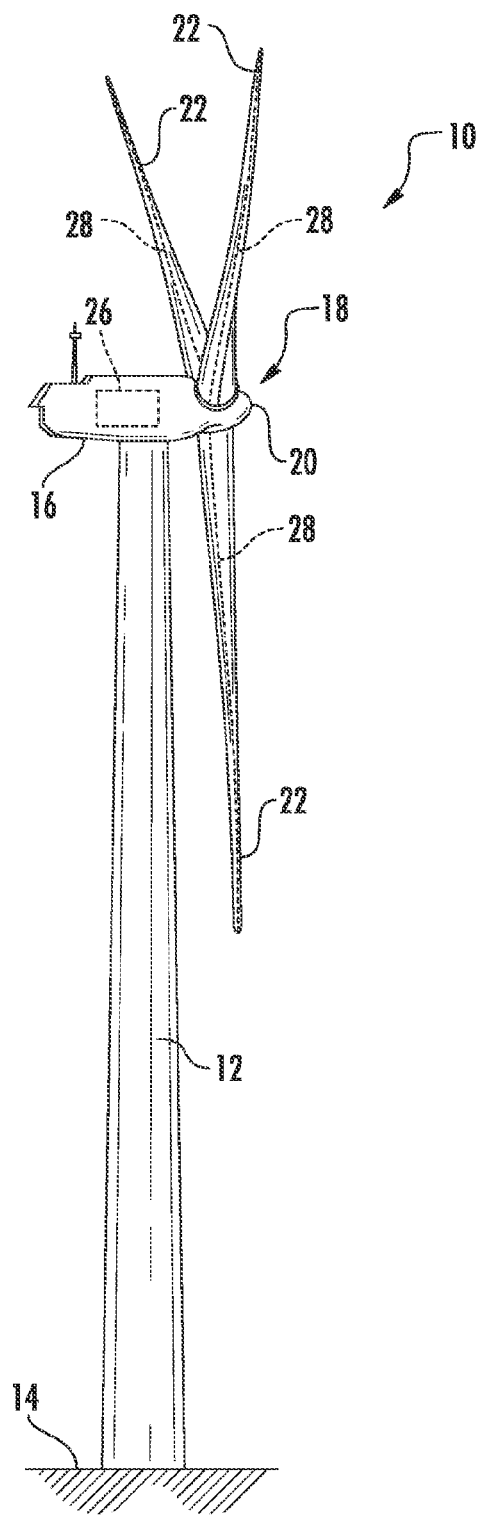
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to an improved system and method for operating a wind turbine during low wind-speed conditions. For example, in one embodiment, the present subject matter determines one or more actual environmental conditions near the wind turbine and continuously adjusts a cut-in wind speed of the wind turbine based on the environmental conditions. More specifically, in another embodiment, the wind control system may include a predetermined cut-in wind speed for the wind turbine based on at least one estimated environmental condition. The system may also determine one or more actual environmental conditions for a predetermined time period at the wind turbine site. The system can then determine a variance between the estimated and actual environmental conditions. From the variance, the system can calculate the dynamic cut-in wind speed that more accurately reflects site conditions in comparison to the predetermined cut-in wind speed. As such, the wind turbine can be operated based on the dynamic cut-in wind speed so as to increase energy production of the wind turbine during low-wind speed conditions.

The system and method of the present disclosure provides many advantages not present in the cited art. For example, the dynamic cut-in wind speed can improve energy production at low wind bins by increasing the probability to start energy production at lower wind speeds during steady wind conditions based on various environmental conditions. More specifically, during steady wind conditions, the dynamic cut-in wind speed may be lower than the predetermined cut-in wind speed so as to capture more energy at lower wind speeds. In contrast, during turbulent wind conditions, the dynamic cut-in wind speed may be higher than the predetermined cut-in wind speed so as to reduce the number of start-up/shutdown cycles. As such, structural fatigue may be reduced by reducing the number of repeated start-up/shutdown cycles caused the fluctuating wind speeds. Accordingly, the overall annual energy production (AEP) may be increased due to the dynamic cut-in wind speed based on varying environmental conditions.

Referring now to FIG. 1, a perspective view of one embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine operating signals. Accordingly, the controller 26 may generally be configured to control the various operating modes (e.g., start-up or shut-down sequences) and/or control various components of the wind turbine 10 as will be discussed in more detail below.

Figure 2:
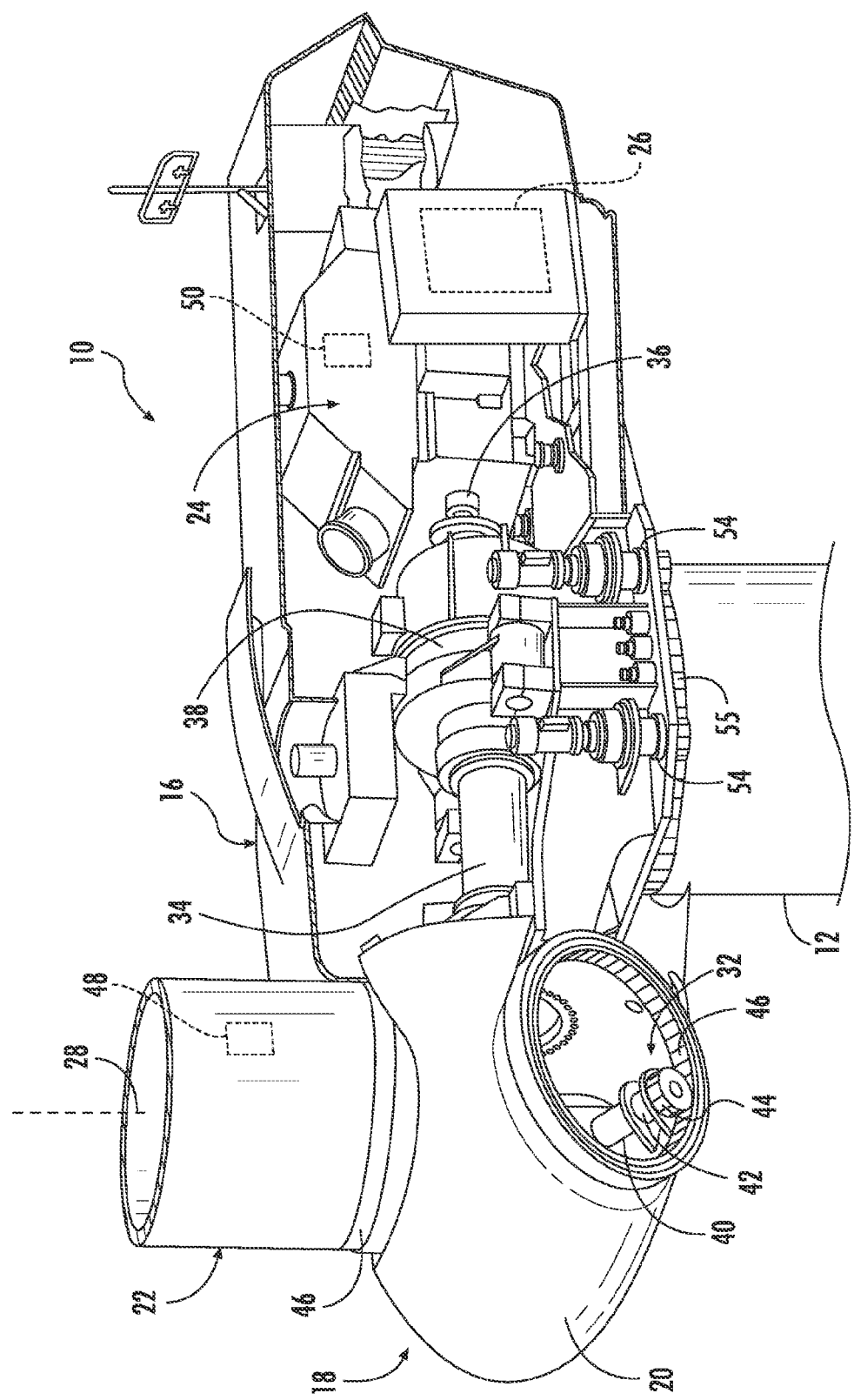
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 54 communicatively coupled to the controller 26, with each yaw drive mechanism(s) 54 being configured to change the angle of the nacelle 16 relative to the wind (e.g., by engaging a yaw bearing 55 of the wind turbine 10).

Still referring to FIG. 2, the wind turbine 10 may also include one or more sensors 48, 50, 52 for measuring the environmental condition(s) as described herein. For example, in various embodiments, the sensors 48, 50, 52 may be wind parameter sensors configured to measure various wind parameters, such as wind speed, wind gusts, wind acceleration, wind veer, wind peaks, wind turbulence, wind shear, changes in wind direction, wakes, air density, or any other wind parameter. Further, the sensors 48, 50, 52 may be located at any suitable location on or around the wind turbine 10 (e.g. on the ground near the wind turbine 10, on the nacelle 16, or on a meteorological mast of the wind turbine 10). In addition, it should be understood that any number and/or type of sensors may be employed. For example, the sensors may be Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors.

Figure 3:
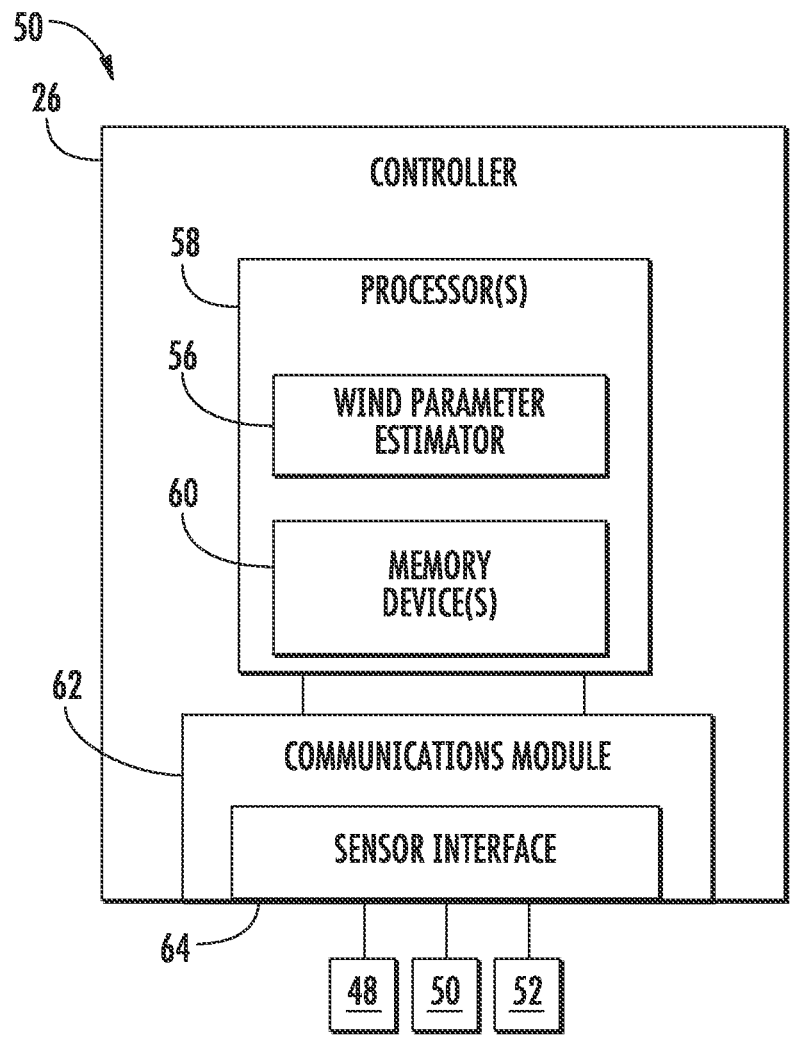
FIG. 3 illustrates a schematic diagram of one embodiment of a controller according to the present disclosure.

Referring now to FIG. 3, a block diagram of various components of the controller 26 according to the present disclosure is illustrated. As shown, the controller 26 may include one or more processor(s) 58, a wind parameter estimator 56, and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. For example, as shown, the communications module 62 may include a sensor interface 64 (e.g., one or more analog-to-digital converters) to permit signals transmitted from the sensors 48, 50, 52 to be converted into signals that can be understood and processed by the processor 58. It should be appreciated that the sensors 48, 50, 52 may be communicatively coupled to the communications module 62 using any suitable means. For example, as shown in FIG. 3, the sensors 48, 50, 52 are coupled to the sensor interface 64 via a wired connection. However, in other embodiments, the sensors 48, 50, 52 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions as described herein.

The wind parameter estimator 56 may be generally configured to estimate one or more environmental conditions acting near the wind turbine 10. For example, the wind parameter estimator 56 may be considered software that utilizes a plurality of operating conditions to calculate, in real-time, one or more environmental conditions of the wind turbine 10. Further, the wind parameter estimator 56 may comprise firmware that includes the software, which may be executed by the processor 58. As such, in one embodiment, the wind parameter estimator 56 may be configured to implement a control algorithm having a series of equations to determine the actual environmental conditions. More specifically, the equations may be solved using one or more operating conditions, one or more aerodynamic performance maps, and one or more look-up-tables (LUTs), or any combination thereof. The operating conditions may include any operation parameters of the wind turbine, including, but not limited to: a pitch angle, a rotor speed, a generator speed, a power output, a torque output, a temperature, a pressure, a tip speed ratio, an air density, or similar. The aerodynamic performance maps are typically dimensional or non-dimensional tables that describe rotor loading and performance (e.g. power, thrust, torque, or bending moment, or similar) under given conditions (e.g. density, wind speed, rotor speed, pitch angles, or similar). As such, the aerodynamic performance maps may include: a power coefficient, a thrust coefficient, a torque coefficient, and/or partial derivatives with respect to pitch angle, rotor speed, or tip speed ratio. Alternatively, the aerodynamic performance maps can be dimensional power, thrust, and/or torque values instead of coefficients.

Figure 4:
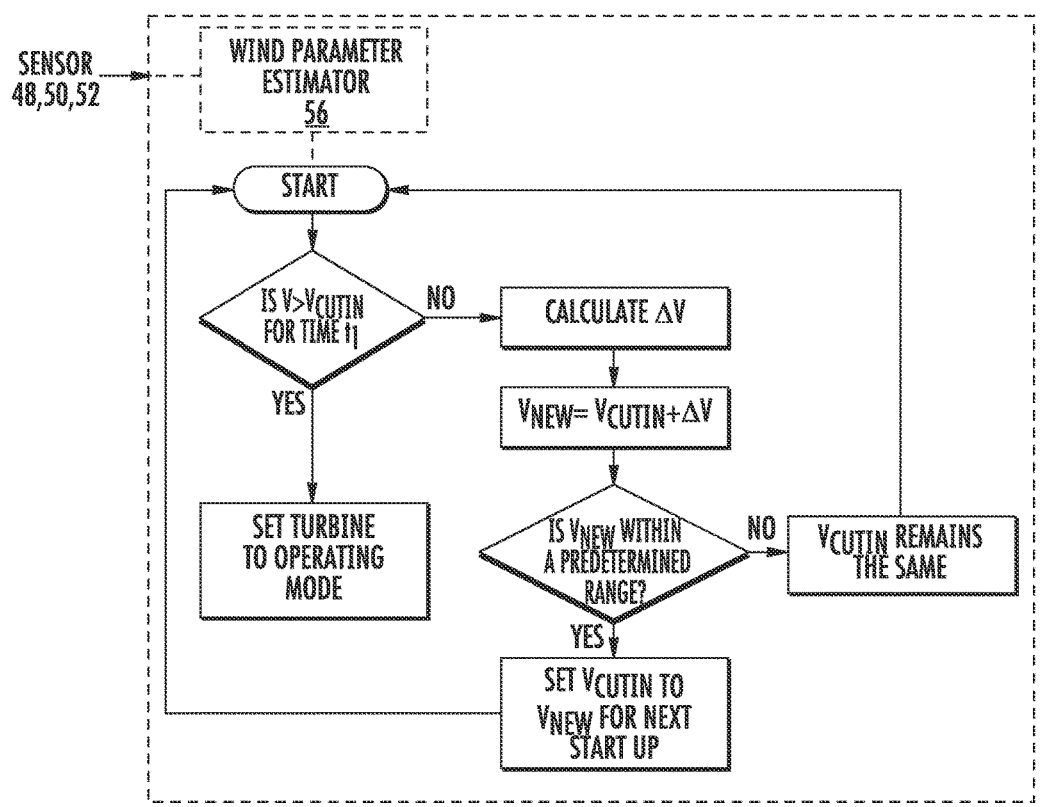
FIG. 4 illustrates a schematic diagram of one embodiment of a processor according to the present disclosure; and, FIG. 5 illustrates a flow diagram of one embodiment of a method for operating a wind turbine during low wind-speed conditions according to the present disclosure.

Referring now to FIG. 4, a block diagram to further illustrate various steps of the processor 58 according to the present disclosure is illustrated. In general, the processor 58 is configured to determine one or more actual environmental conditions near the wind turbine 10 and continuously adjust a cut-in wind speed of the wind turbine 10 based on the environmental conditions. More specifically, in various embodiments, the processor 58 may be pre-programmed with a predetermined cut-in wind speed $V_{cut-in}$ based on one or more estimated environmental conditions (e.g. an estimated wind speed and/or air density for the wind turbine site). The processor 58 can also determine one or more actual environmental conditions using the sensors 48, 50, 52 (e.g. by direct or indirect monitoring) or may estimate the actual environmental conditions using one or more computer models (e.g. using the wind parameter estimator 56). In addition, the actual environmental conditions may optionally be stored in the memory store 60 for a predetermined time period $t_1$. It should be understood that the predetermined time period $t_1$ may be any suitable amount of time, e.g. seconds, minutes, or hours. As such, the processor 58 is configured to compare the estimated environmental conditions and the actual environmental conditions so as to determine a variance $\Delta V$. Accordingly, the variance $\Delta V$ can be used to continuously calculate a dynamic cut-in wind speed $V_{new}$ for the wind turbine 10 that more accurately reflects changing site conditions in comparison to the fixed, predetermined cut-in wind speed $V_{cut-in}$.

More specifically, as shown in the illustrated embodiment, the actual environmental conditions as determined by the sensors 48, 50, 52 and/or the wind parameter estimator 56 may be used to determine a current, actual wind speed V acting near the wind turbine 10. The processor 58 may then compare the actual wind speed V and the predetermined cut-in wind speed $V_{cut-in}$. If the actual wind speed V is greater than the predetermined cut-in wind speed $V_{cut-in}$, then the wind turbine can be set to an operational mode (i.e. the wind turbine 10 can begin to generate power). If the actual wind speed V is less than the predetermined cut-in wind speed $V_{cut-in}$, then a variance $\Delta V$ may be calculated between the estimated environmental conditions and the actual environmental conditions to ensure that the predetermined cut-in wind speed $V_{cut-in}$ still accurately reflects actual site conditions. As such, the variance $\Delta V$ may be any suitable value that represents the difference and/or error between estimated environmental conditions (e.g. environmental conditions estimated before actual site data were known) and actual environmental conditions at the wind turbine site. Accordingly, the processor 58 is configured to continuously monitor site conditions and update the predetermined cut-in wind speed $V_{cut-in}$ in response.

More specifically, the variance $\Delta V$ can be used to calculate a dynamic cut-in wind speed $V_{new}$ that more accurately reflects changing site conditions. For example, in one embodiment, the dynamic cut-in wind speed $V_{new}$ may be calculated by adding the variance $\Delta V$ to the predetermined cut-in wind speed $V_{cut-in}$ to obtain the dynamic cut-in wind speed $V_{new}$. In addition, in one embodiment, during steady conditions, the variance $\Delta V$ is typically a negative value such that addition of the variance $\Delta V$ and the predetermined cut-in wind speed $V_{cut-in}$ provides a dynamic cut-in wind speed $V_{new}$ having a lower value than the predetermined cut-in wind speed $V_{cut-in}$. As such, the lower dynamic cut-in wind speed is configured to capture more energy at lower wind speeds. Alternatively, during turbulent wind conditions, the variance $\Delta V$ may be a positive value such that addition of the variance $\Delta V$ and the predetermined cut-in wind speed $V_{cut-in}$ provides a dynamic cut-in wind speed $V_{new}$ having a higher value than the predetermined cut-in wind speed $V_{cut-in}$. As such, the higher dynamic cut-in wind speed is configured to reduce the number of start-up/shut-down cycles. As such, structural fatigue may be reduced by reducing the number of repeated start-up/shutdown cycles caused the fluctuating wind speeds.

As used herein, steady wind conditions typically represent wind conditions that have relatively low turbulence intensity (e.g. less than 5%). In contrast, turbulent wind conditions typically represent wind conditions that have relatively high turbulence intensity (e.g. greater than 5%). It should be understood by those skilled in the art that the term "turbulence intensity" as used herein is typically defined as the standard deviation of the horizontal wind speed divided by the average wind speed over a predetermined time period (e.g. 10 minutes).

Still referring to FIG. 4, in various embodiments, the processor 58 may also determine whether the dynamic cut-in wind speed $V_{new}$ is within a predetermined range. For example, the predetermined range may define a minimum and a maximum cut-in wind speed for safe and reliable wind turbine operation. If the dynamic cut-in wind speed $V_{new}$ is within the predetermined range, the controller 26 is configured to operate the wind turbine 10 based on the dynamic cut-in wind speed $V_{new}$ so as to increase energy production of the wind turbine 10 during low wind speed conditions.

As mentioned, operating the wind turbine 10 with the dynamic cut-in wind speed $V_{new}$ may reduce the number of wind turbine operational cycles. For example, by dynamically changing the cut-in wind speed, the controller 26 is configured to reduce the number of start-up events and shut-down events, thereby reducing structural fatigue on the wind turbine 10. If the dynamic cut-in wind speed $V_{new}$ is not within the predetermined range, then the processor 58 is configured to maintain the current operational status of the wind turbine 10 (i.e. the predetermined cut-in wind speed $V_{cut-in}$ is the default operating parameter). In both instances, the processor 58 is configured to continuously operate the algorithm as described herein such that the cut-in wind speed of the wind turbine 10 is dynamically changing with environmental conditions.

Figure 5:
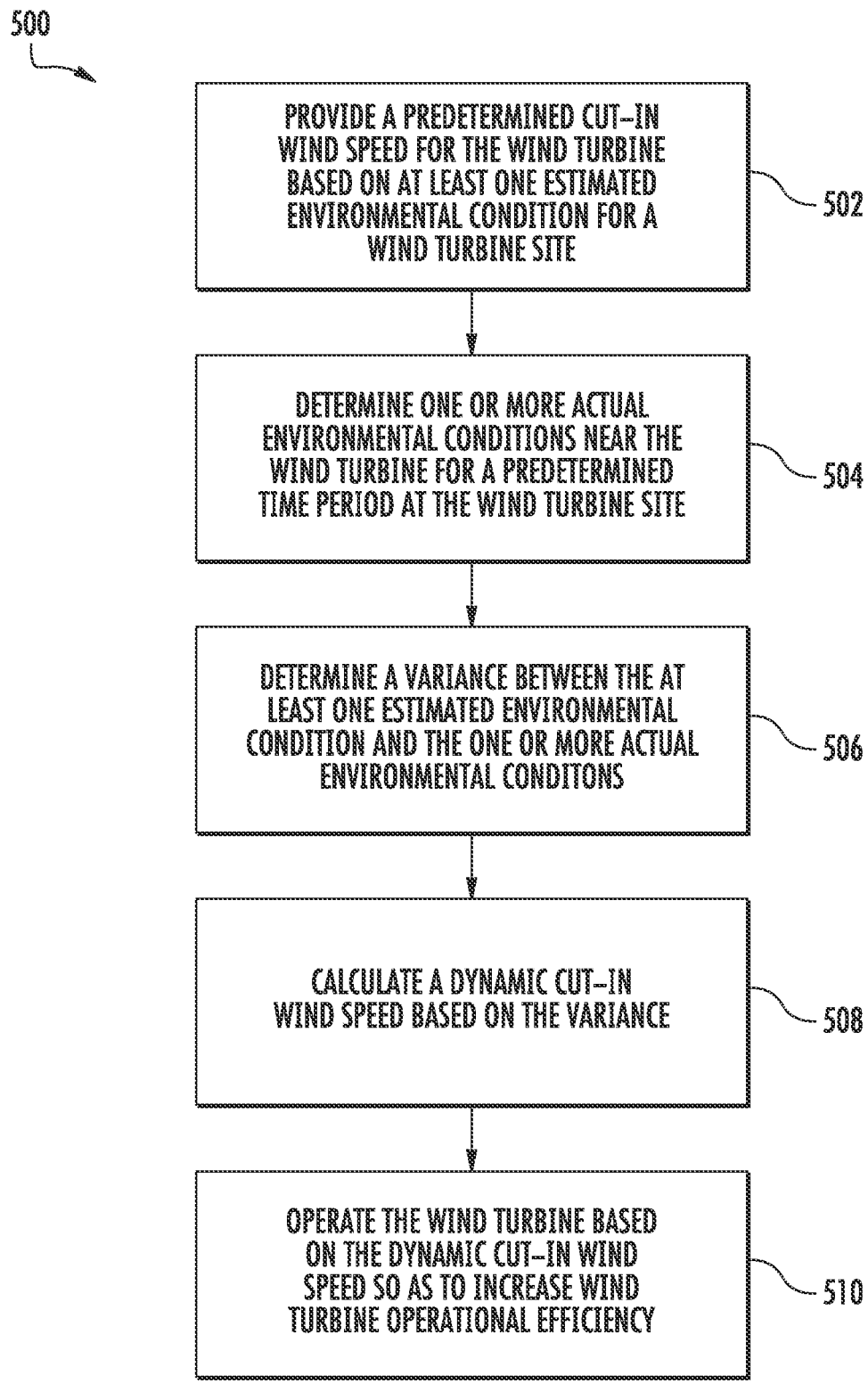

Referring now to FIG. 5, a flow diagram of a method 500 for operating a wind turbine during low wind-speed conditions according to one embodiment of the present disclosure is illustrated. As shown, the method 500 includes a first step 502 of providing a predetermined cut-in wind speed for the wind turbine based on at least one estimated environmental condition for a wind turbine site. Another step 504 includes determining one or more actual environmental conditions near the wind turbine for a predetermined time period at the wind turbine site. The method 500 may also include a step 506 of determining a variance between the at least one estimated environmental condition and the one or more actual environmental conditions. As such, the method 500 may then include the step 508 of calculating a dynamic cut-in wind speed based on the variance. Further, the method 500 may include a step 510 of operating the wind turbine based on the dynamic cut-in wind speed so as to increase energy production of the wind turbine during low wind speed conditions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine, the method comprising:
   providing a predetermined cut-in wind speed set point for the wind turbine based on at least one estimated environmental condition for a wind turbine site;
   determining one or more actual environmental conditions near the wind turbine for a predetermined time period at the wind turbine site, the estimated and actual environmental conditions comprising air density and at least one of or a combination of the following: wind speed, wind gust, wind direction, wind acceleration, wind turbulence, wind shear, wind veer, or wake;
   determining a variance between the at least one estimated environmental condition and the one or more actual environmental conditions;
   calculating a dynamic cut-in wind speed set point based on the variance and the predetermined cut-in wind speed set point; and,
   continuously changing a cut-in speed of the wind turbine based on the dynamic cut-in wind speed set point so as to increase wind turbine operational efficiency.

2. The method of claim 1, wherein determining one or more actual environmental conditions near the wind turbine for a predetermined time period further comprises utilizing one or more sensors to monitor the environmental conditions.

3. The method of claim 1, wherein determining one or more actual environmental conditions near the wind turbine for a predetermined time period further comprises estimating the environmental conditions utilizing one or more computer models.

4. The method of claim 3, wherein the one or more computer models comprises utilizing at least one of or combination of the following: one or more operating conditions of the wind turbine, a plurality of equations, one or more aerodynamic performance maps, or one or more look-up tables.

5. The method of claim 4, wherein the operating conditions comprise any of the following: a pitch angle, a rotor speed, a generator speed, a power output, a torque output, a temperature, a pressure, a tip speed ratio, or an air density.

6. The method of claim 1, further comprising storing the environmental conditions for the predetermined time period in a memory store.

7. The method of claim 1, further comprising verifying that the dynamic cut-in wind speed set point is within a predetermined range of wind speeds.

8. The method of claim 1, wherein calculating the dynamic cut-in wind speed set point based on the variance further comprises adding the variance to the predetermined cut-in wind speed set point to obtain the dynamic cut-in wind speed set point.

9. A method for operating a wind turbine, the method comprising:
   determining one or more actual environmental conditions near the wind turbine, the actual environmental conditions comprising air density and at least one of or a combination of the following: wind speed, wind gust, wind direction, wind acceleration, wind turbulence, wind shear, wind veer, or wake;
   continuously determining a dynamic cut-in wind speed set point of the wind turbine based on the one or more actual environmental conditions and a predetermined cut-in wind speed set point; and,
   continuously changing a cut-in speed of the wind turbine based on the dynamic cut-in wind speed set point so as to increase wind turbine operational efficiency.

10. The method of claim 9, wherein continuously determining the dynamic cut-in wind speed set point of the wind turbine based on the actual environmental conditions further comprises:
    determining a variance between at least one estimated environmental condition and the one or more actual environmental conditions; and,
    determining the dynamic cut-in wind speed set point based on the variance.

11. The method of claim 10, wherein determining the dynamic cut-in wind speed set point based on the variance further comprises adding the variance to the predetermined cut-in wind speed set point.

12. The method of claim 9, further comprising verifying that the dynamic cut-in wind speed set point is within a predetermined range of wind speeds.

13. A system for operating a wind turbine, the system comprising:
    a processor configured to:
       determine one or more actual environmental conditions near the wind turbine for a predetermined time period at the wind turbine site;
       determine a variance between one or more estimated environmental conditions and the actual environmental conditions, the estimated and actual environmental conditions comprising air density and at least one of or a combination of the following: wind speed, wind gust, wind direction, wind acceleration, wind turbulence, wind shear, wind veer, or wake;
       calculate a dynamic cut-in wind speed set point based on the variance and a predetermined cut-in wind speed set point; and,
    a controller configured to continuously change a cut-in speed of the wind turbine based on the dynamic cut-in wind speed set point so as to increase wind turbine operational efficiency.

14. The system of claim 13, wherein the processor is further configured to verify that the dynamic cut-in wind speed set point is within a predetermined range of wind speeds.

15. The system of claim 13, further comprising a wind parameter estimator configured to estimate the one or more actual environmental conditions.

16. The system of claim 13, further comprising one or more sensors configured to monitor the one or more actual environmental conditions.

17. The system of claim 13, further comprising a memory store configured to store the environmental conditions for the predetermined time period.

\* \* \* \* \*